United States Patent [19]

Kasin

[11] 4,145,092

[45] Mar. 20, 1979

[54] FLEXIBLE TRACK FOR VEHICLES

[75] Inventor: Hans Kasin, Notodden, Norway

[73] Assignee: Gravbergskovens Aktieselskab, Sarpsborg, Norway

[21] Appl. No.: 764,107

[22] Filed: Jan. 31, 1977

[30] Foreign Application Priority Data

Feb. 18, 1976 [NO] Norway .................................. 760540

[51] Int. Cl.$^2$ ............................................. B62D 55/24
[52] U.S. Cl. .................. 305/35 EB; 305/37; 305/38; 305/56
[58] Field of Search ............ 305/37, 38, 35 EB, 35 R, 305/56

[56] References Cited

U.S. PATENT DOCUMENTS

| 2,732,265 | 1/1956 | Cuthbertson | 305/37 |
|---|---|---|---|
| 2,786,725 | 3/1957 | Thorne | 305/37 |
| 3,019,062 | 1/1962 | Long | 305/37 |
| 3,463,562 | 8/1969 | Svensson | 305/38 |
| 3,853,359 | 12/1974 | Pusch | 305/35 EB |

Primary Examiner—John P. Shannon
Attorney, Agent, or Firm—Ladas, Parry, Von Gehr, Goldsmith & Deschamps

[57] ABSTRACT

A flexible vehicle track section for an endless vehicle track has two parallel spaced track belts mutually connected by transverse bars which also serve for transferring drive power from a vehicle wheel to the track. Each section comprises two juxtaposed moulded track units of rubber or similar material each extending over a substantial number of bars, e.g. having a length about 0.5-2 m or more. The outer side face of the unit pad carries spacingly arranged transverse gripping ribs. Apertures with suitable guide sleeves are provided in the track unit pad between the gripping ribs for mounting the transverse bars on the side face being opposite to the ribs. The transverse bars have wing portions with arcuate convex guide cleats thereon projecting in direction away from the track unit pad. In each unit pad a tension wire cable is embedded in the rubber material in shape of an endless loop extending around the peripheral portion of the unit pad. At the ends of the unit retaining members are provided for connection with corresponding members in an adjacent unit and serving for anchoring portions of the tension cable in the pad. I-shaped connection members between successive units in a track belt are provided having an upper flange portion similar to any of the transverse bars for driving and controlling the track section.

8 Claims, 7 Drawing Figures

FLEXIBLE TRACK FOR VEHICLES

BACKGROUND OF THE INVENTION

1. Field of the Invention

The present invention generally relates to a vehicle track of that kind which comprises a series of track belt sections or units each of them carrying transverse outer grip ribs and being supported by transverse inner drive bars.

2. Description of the Prior Art

Vehicle tracks for tractors, cross-country trucks, working machines and the like are known in various embodiments. Some tracks comprise endless parallel belts being connected with one another by transverse bars also serving as driving members and as gripping members or carrying such gripping members. Some other tracks have belts comprising a plurality of transverse belt units connected in series by transverse connection links which can be shaped as or provided with soil gripping means.

A substantial disadvantage in tracks comprising endless belts resides in the fact that in case of a rather local damage on a belt it can be necessary to dismount the whole belt or track. Some belts have a plurality of endless wires with equal dimension extending along the belt pad. A heavy shock on the belt edge can break the outer wire and further damage can hardly be stopped, because none of the wires have the strength to withstand the whole load tensioning the belt.

A further drawback in endless belts having gripping ribs on the outer side and transverse drive bars on the inner side is the fact that the anchoring between the drive bars and the belt is too stiff because the anchoring is located in the rib area. A consequence is that the transverse bar or the rib, respectively, often can be torn off the track material when the vehicle is stuck in the ground and the track is subjected to maximal load.

It also often appears that it is desirable that the gripping capacity towards the ground be somewhat greater than what is the case with the known track belts having continuous transverse ribs.

OBJECTS OF THE INVENTION

The object of the invention is to avoid the above mentioned disadvantages and to provide a track for vehicles which can be easily mounted and dismounted and which allows a quick replacing of damaged parts and which is less subjected to disturbances in operation than the previously known tracks.

SUMMARY OF THE INVENTION

The present invention generally comprises a flexible unit for an endless vehicle track comprising a pad of moulded rubber having a length dimension greater than the transverse width dimension thereof, said pad having on one of the main side faces thereof a plurality of transverse longitudinally spaced gripping ribs for gripping the ground, said ribs being integral with the pad and a plurality of securing locations positioned between each pair of the gripping ribs for securing of drive members onto the opposite side face of the pad, said drive members being adapted to engage at least one wheel of a vehicle, said pad having at the ends thereof means for connection with corresponding means at the end of the pad in an adjacent track unit and being at least partly embedded in the pad material, said pad containing a single flexible tension member in shape of an endless loop embedded in the rubber material of the pad and extending around the periphery of the unit pad between the securing locations for the drive members and the peripheral edge of the pad so that it covers all gripping ribs of the track unit. Preferably, the tension member is a wire cable.

The invention also comprises a flexible track section for an endless vehicle track comprising at least two flexible vehicle track units of the kind stated in the foregoing paragraph, said units being laterally separated from one another and comprising a plurality of longitudinally spaced transverse elongated members being secured to both track units at the securing locations positioned between the gripping ribs for connection of the two track units with one another so that they are maintained parallel and transversely spaced from one another, said transverse member being adapted to engage at least one wheel of a vehicle and so serving as drive members of the track section.

The length of the track units can vary dependent on the size and kind of the vehicle, but length dimensions between 0.5 and 2 m seem suitable for many purposes.

To prevent intrusion of foreign bodies between the tractor wheels and the track the lateral portions of the transverse elongated members are provided with convex bows projecting upwardly, i.e. with the top thereof facing away from the bar transverse member. At the ends of the transverse members end plates are welded on to protect the side edge of the track against damage. The invention also comprises connection means to connect the ends of the track units with one another. These means are made so that they also act as the above mentioned transverse members, i.e. they connect the juxtaposed track units in a unit couple and engage the wheels of the vehicle.

The invention will be explained more closely in the following by means of an example and with reference to the attached drawings.

BRIEF DESCRIPTION OF THE DRAWINGS

FIG. 2 is a partial sectional view along line II—II of FIG. 1a.

FIG. 6 is a sectional view along line VI—VI of FIG. 4, but

FIG. 6 can also be considered a continuation of FIG. 5, said Figures thus showing a sectional view of the juxtaposed track units of a track section according to the invention.

DESCRIPTION OF THE PREFERRED EMBODIMENT

Figure 1A:
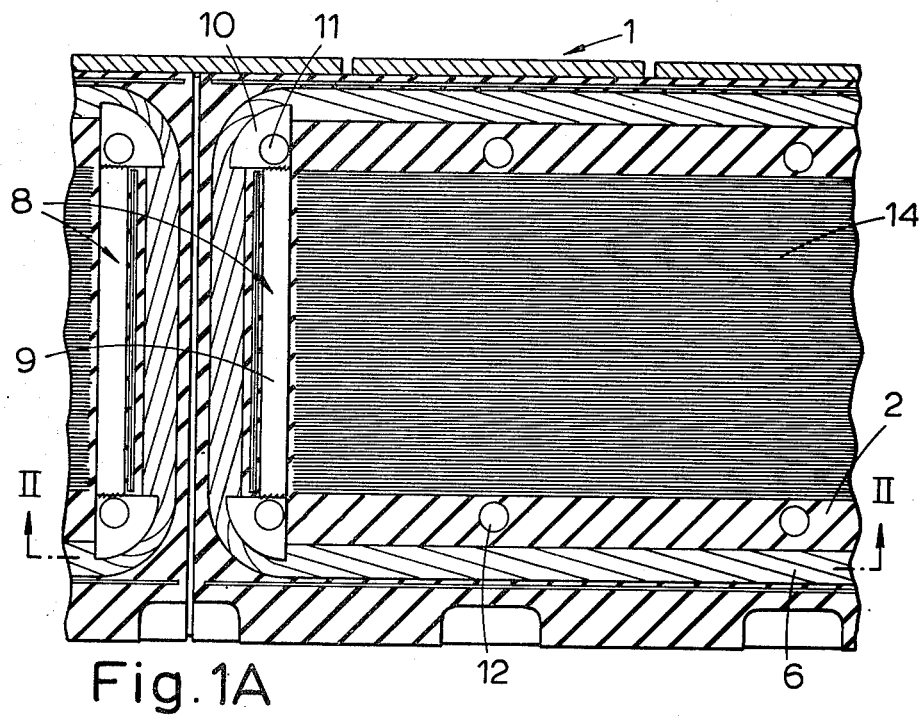
FIG. 1 is a longitudinal sectional view through a track unit according to the invention extending along a median plane substantially parallel with the top and bottom of the unit, e.g. along line I—I of FIGS. 2 and 3.
Figure 1B:
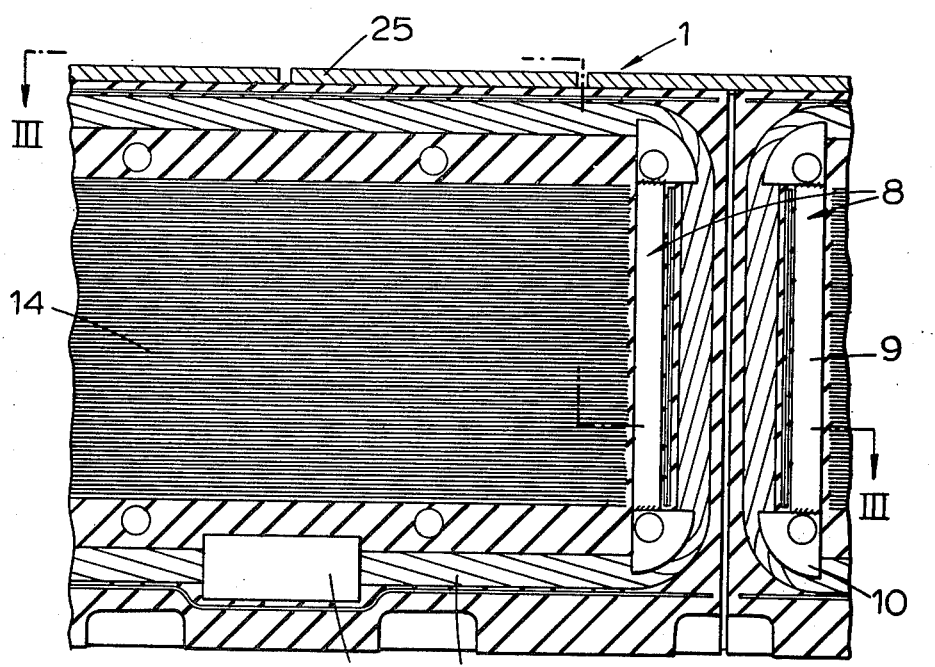

Referring to FIG. 1, a flexible track unit 1 of rubber or similar material (shown with reduced length) comprises generally a flexible pad 2 or base plate which on the under (outer) side thereof is provided with integral transverse longitudinally spaced parallel gripping ribs 3 of the pad material. Generally, the length of the ribs is equal to the width of the pad, but some of the ribs, e.g. rib 4, are made shorter than the other ribs to improve gripping capacity and better contact with the ground in broken areas. The pad 2 has a substantially flat top surface, but this is not critical to the invention.

The inner structure of the pad will now be explained. A wire cable 6 of steel or other material with great yielding strength in shape of an endless loop with a rather four-sided form is embedded in the rubber pad material. The wire cable extends along the periphery of the pad 2 at little distance from the side and end edges of the track unit. According to the drawings the ends of the cable 6 are joined together by means of a wire clamp 7, however, the loop ends can be spliced integrally, i.e. without clamp socket and without substantial increment of the cross section of the joint.

At either end of the pad 2 of the track unit 1 a wire retainer 8 is embedded in the pad material. Each wire retainer consists of a flat transverse rod 9 (see also FIG. 3) and two transversally spaced quarter-circle-shaped end guides 10 having its peripheral arc surface shaped with a groove corresponding to the cross section shape of the wire cable. The transverse rod 9 and the guide members 10 are connected with one another, preferably by welding. Each end guide member 10 has a thickness somewhat greater than that of the wire cable 6 and is provided with a hole 11 for a bolt, such as bolt 13, which will be disclosed more in detail in the following. The retainer 8 serves as anchor for the wire cable 6 in the pad and transfers the pulling forces acting between successive track sections 1 in a track.

Along either longitudinal side of the track unit 1 at a distance inwardly from the wire cable 6 bolt holes are spacingly arranged with regular intervals and provided with sleeves (FIG. 5) for bolts 13 for securing of bars 17 (see FIG. 5), as it will be explained in the following. The track unit pad 2 contains a cord insert 14 of suitable textile material. Some of the cords can be wound around the wire cable 6 (shown in FIG. 5) and around the flat end rod 9 (see FIG. 3) for better anchoring.

As it appears from most of the Figures the sleeves 12 for the bolts 13 are located transversely spaced in the pad portions 15 extending between the gripping ribs 3.

Figure 5:
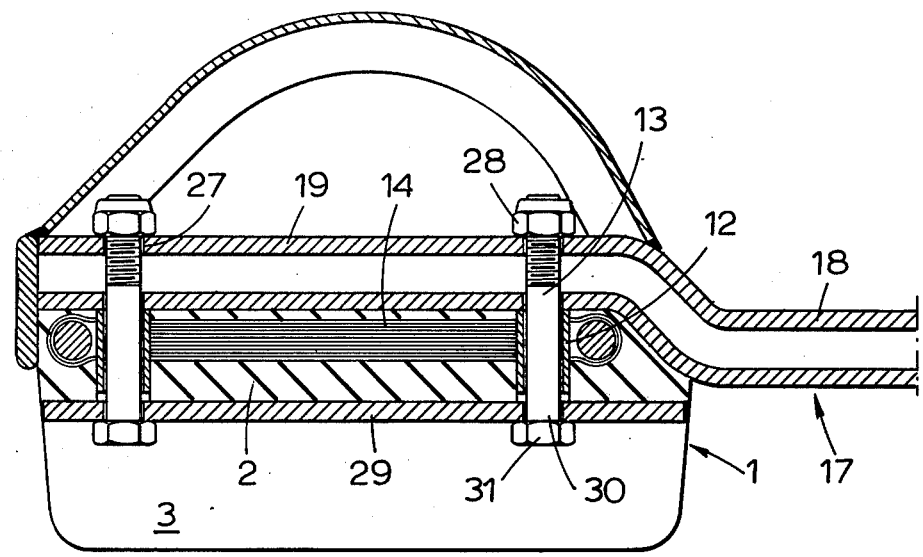
FIG. 5 is a sectional view along line V—V of FIG. 4.
Figure 6:
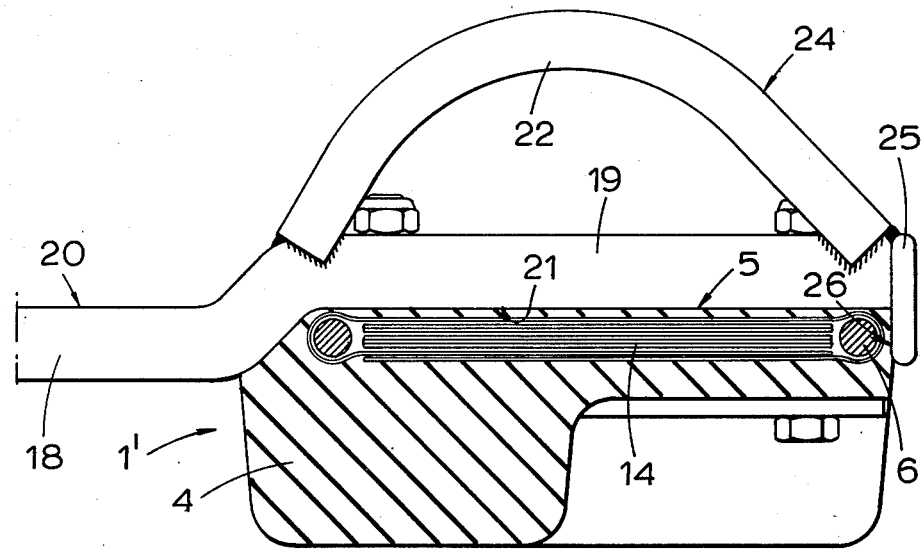

The bolts 13 connect the track unit 1 with transverse support and drive bars 17. Such a bar is shown in FIGS. 5 and 6 which should be considered together. FIG. 5 shows a longitudinal sectional view of the bar, whereas FIG. 6 is a front elevation.

It should be noted that FIGS. 5 and 6, when viewed together or considered as a continuation of one another, show a partial sectional view of a vehicle track section comprising two parallel track units 1, 1' being laterally spaced and fixedly connected with one another by the transverse connecting drive bars 17. The number of the bars 17 in each track section (comprising a couple of units 1) corresponds to the number of intervals between the gripping ribs 3, 4 in a track unit 1.

Each bar 17 has a central portion 18 adapted to engage a drive or support wheel (not shown) of a vehicle and has two side portions or wings 19, either of them being secured to a track unit 1, 1', respectively, by means of the bolts 13 mentioned above. As it appears from FIGS. 5 and 6 the central portion of the bar 17 is offset to the wings 19 so that the top surface 20 of the central portion 18 is substantially registering with the bottom surface 21 of the wings 19 which surface in turn registers with the top surface 5 of the track unit pad 2. The bars 17 are made from steel and, as it appears from FIGS. 2 and 3, they are tubular and have a hollow rectangular or trapezium shaped cross section. The particular shape of the bar 17 with the offset central portion brings about the consequence that when a track unit is located on the drive wheel of a vehicle the inner radius of the (bent) track unit is about equal to the root circle radius of the drive gear wheel which in the above mentioned position substantially corresponds to the circle radius for the top surface 20 of the central portion 18 of the drive bar 17, when the relevant track unit is in bent condition. Thus, the track unit 1 has no momentum lever to act upon in the radial direction which in turn brings about that the self adjusting properties of the track on a drive wheel or support wheel of a vehicle are very satisfactory. On the top or inner side the transverse bar wings 19 are provided with bow-shaped cleats 22 made from a profile section having U-shaped cross section with the U-opening facing the transverse bar. The bows or cleats 22 are fixed onto the bars by welding and act as guides for the track, as the inner surfaces of the cleats engage the flanks of the drive wheels and support wheels of a vehicle when in operation. The outer surfaces 24 of the cleats 22 serve as rejectors to reject foreign bodies. When a vehicle is in operation and the track is on movement the distance between the cleats 22 is substantially equal along the whole height dimension of the cleats as long as the track unit with the bars are within the straight reach of the moving track. Then, the track section rises itself when following upwardly around an end wheel of the vehicle and the distance between the tops of the adjacent cleats 22 decreases strongly and progressively, the effect being that the cleats will reject tree logs, beams, stones and the like and prevent them from intruding between the track and the wheel.

Each bar 17 is at either end thereof provided with guard plates 25 being parallel with and covering both the end of the bar and a substantial portion of the side edge surface 26 of the pad 2. The guard plates 25 protect the edge of the track unit against tearing up (fringing). They are fixed by welding. Either wing 19 of the transverse bar 17 is provided with two holes 27 for the bolts 13.

Each bolt 13 extends through the hole in the wing 19 of the bar 17 and is tightened by a nut 28. The height of the bolt sleeve 12 is somewhat less than the thickness of the pad 1. On the under side of the pad 2 between the ribs 3 a counter plate 29 with bolt holes 30 is mounted between the bolt head 31 and the under side of the pad 2 (FIG. 5).

Figure 2:
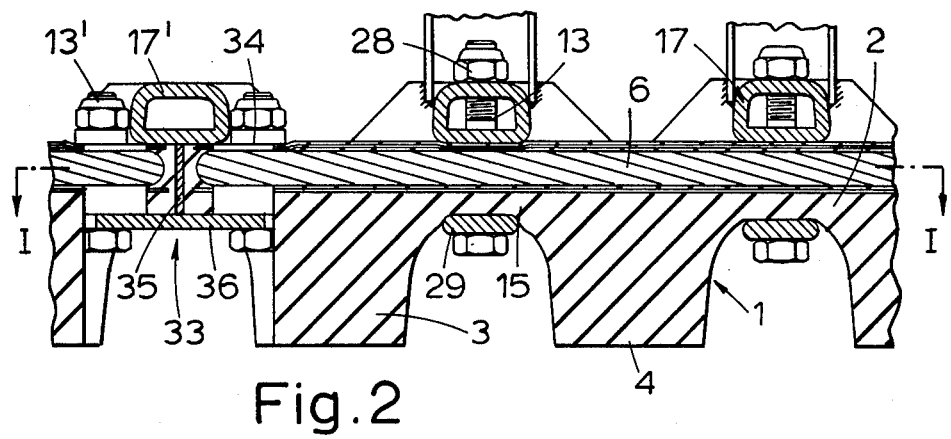
Figure 3:
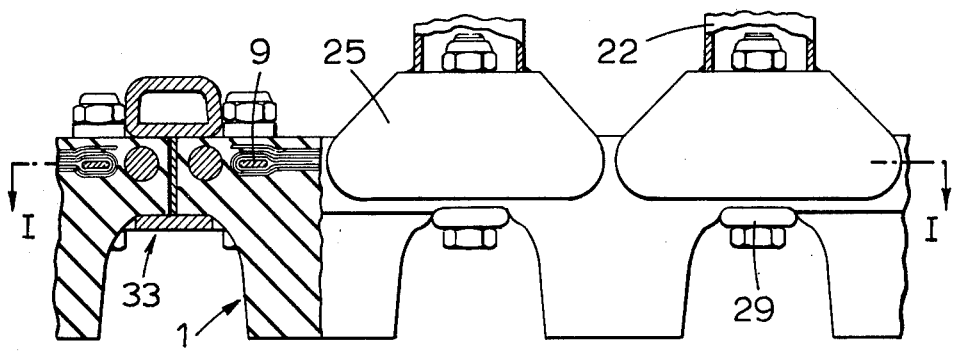
FIG. 3 is a sectional view along line III—III of FIG. 1b.
Figure 4:
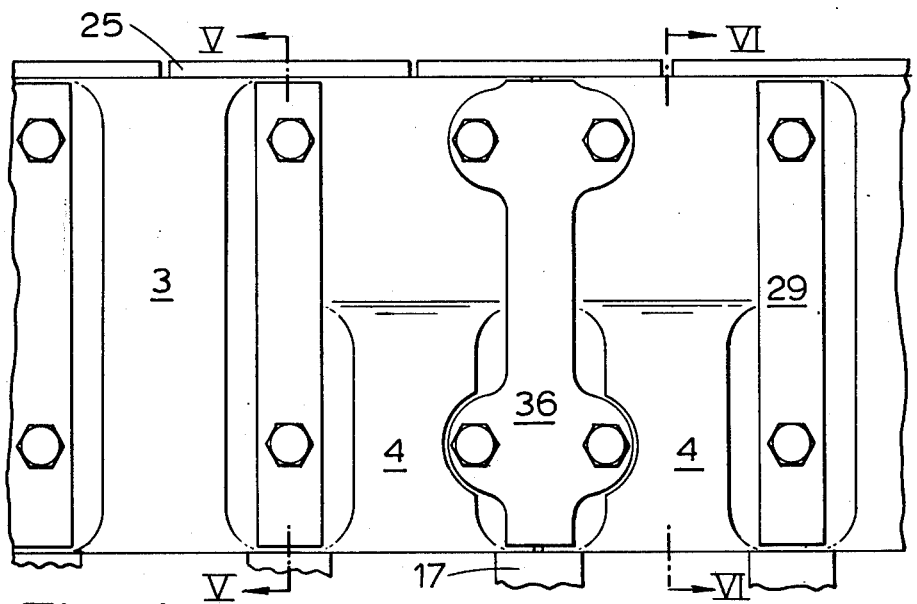
FIG. 4 is a bottom view of the end portions of two adjacent track units.

In FIG. 2 at left and in FIG. 3 at right a sectional view is shown of a track band connector 33 for connecting successive track sections 1, 1'. As stated above a track section comprises a couple of juxtaposed units 1, 1'. Each connector 33 comprises a transversal bar 17' substantially shaped as the bars 17. Each of the wing portions of the bar 17' has on the under side thereof a lateral top flange 34 or two semiflanges 34, as shown in FIG. 2, and a web 35 projecting downwardly and extending over the entire length of the wing portion. At its lower end the web 35 supports a lower flange 36. The bar, the web and the flanges are fixed to one another by welding and the connector has a substantially I-shaped cross section. The connecting bolts are shown by 13'. The flanges 34 and 36 are provided with bolt holes (not shown) so spaced longitudinally and transversely that they will register with the holes 11 in the wire cable retainers 8 of two adjacent track sections upon they have been arranged endwise at insignificant distance, as shown in the drawings. The distance between the flanges 34 and 36 is about equal to or somewhat less than the thickness of the pad 2. In plan view the under flange 36 is shaped as shown in FIG. 4.

In operation, when adjacent track sections 1, 1' are bolted together, the pulling forces between two adjacent track sections are transferred by the flanges 34 and 36 of the connectors 33 to the bolts 13' and therefrom to the wire cable retainers 8 which in turn are kept anchored by the wire cables in the rubber pad. A corresponding cable anchoring is found at the opposite end of the track section and, in turn is connected with the adjacent end of the subsequent track section.

The embodiment according to the invention enables the distance between the bolt holes 11 in the retainer guides 10 and the end edge of the track units to be kept at a low value and as shown in FIG. 2, said distance units is not greater than what is required to accommodate the bars 17' and the bolts 13'. Therefore, the stiffness of the connector 33 has been reduced to a reasonable value thus improving the stability of the track and reducing the wear of the track and the drive wheels. Positioning of the transverse bars 17, the bolts 13 and the counter plates 29 in the intervals between the gripping ribs 3 is advantageous as the pad portion with the corresponding transverse bar anchoring will be able to carry out a limited bending movement in relation to the rib portion of the track unit in case the track should be exposed to unduly great local loads so that the rib will not be torn off as it often happens in the embodiments previously known having their drive and support bars as well as the traction ribs located substantially in the same plane being normal to the main plane of the track.

The longitudinal dimension of a track section or track unit can vary from about 0.5 m to about 2 m but the track section can be produced both shorter and longer. It will be understood that a track section can be so long as to correspond to a whole track length dimension.

The invention has been explained in the above in connection with a track having two track belts. However, it will be understood that a track unit made in accordance with the invention can be used in tracks comprising a single belt of units which on the top side thereof are provided with simple transverse bars with drive cleats. Further, it is possible to manufacture a wide track belt comprising more belts than two, e.g. for a vehicle having drive wheels and support wheels made as twin wheels.

Longitudinal wire cables can be provided in the pad of the track section within the wire cable loop. Alternatively, transverse rods can be located in the pad within the cable loop. Possibly, the reinforcement can extend into the ribs.

As indicated above, various changes and modifications in the above described invention and the method of operation thereof will be readily apparent to one skilled in the art and such changes and modifications are deemed to be within the spirit and scope of the present invention as set forth in the following appended claims.

I claim:

1. An endless vehicle drive track which comprises at least two transversely spaced parallel track belts, each track belt comprising a plurality of elongate track units which are arranged one after another in the longitudinal direction of the track belt, and transverse connecting members provided between the ends of adjacent track units to connect the track units with one another, each track unit comprising:

an integral pad which is made of rubber or similar material and has an inner face and an outer face and is formed at its outer face with a plurality of transversely-extending longitudinally-spaced gripping ribs which are integral with the pad, adjacent ribs defining transversely-extending channels therebetween, the channels of each pad of one belt being aligned with respective channels of the pads of each other belt;

first and second transverse retainer members provided at opposite respective ends of the pad and at least partly embedded in the material of the pad said retainer members being connected respectively to the two transverse connecting members provided between the ends of the track unit and the two adjacent track units respectively; and an elongate reinforcing cable embedded in the material of the pad and extending through the body of the pad, the cable forming a single, closed, substantially rectangular loop extending around the periphery of the pad and outside the retainer members to be retained thereby against movement in the longitudinal direction of the pad, and the track further comprising a plurality of transversely-extending longitudinally-spaced drive bars connecting the belts together, each drive bar being disposed at the inner face of a pad of each belt at a position corresponding to a channel defined between two adjacent ribs of a pad of said belt and being secured to each such pad by at least one fastening member which extends through the pad into said channel, there being one drive bar for each channel of said one belt.

2. A drive track as claimed in claim 1, wherein each drive bar has an upper surface and a lower surface and has two end portions which are secured to respective track units of two belts with the lower surface of the end portions towards the track units, and a central portion which is offset from the end portions so that the upper surface of the central portion is in substantial alignment with the lower surface of the end portions, each drive bar being provided with two arcuate top cleats which are welded onto the end portions respectively so as to be concave towards the respective end portions.

3. A drive track as claimed in claim 2, wherein the arcuate cleats are of U-shaped cross-section.

4. A drive track as claimed in claim 1, wherein the drive bars are hollow tubes.

5. A drive track as claimed in claim 1, wherein each drive bar is provided at its opposite ends with guard plates welded thereto for protection of the lateral edges of the track units.

6. A drive track as claimed in claim 1, wherein at least one transverse connecting member of at least one track belt is of substantially I-shaped cross section, the upper cross-member of the I being provided by a portion of an additional transversely-extending drive bar which has other portions secured to the other track belts respectively and by a top flange which is of substantially greater width than said portion of the additional drive bar and is formed with at least two holes, a web whose height is substantially the same as the thickness of the pads of the adjacent track units which are connected by said one transverse connecting member, and a lower flange formed with holes registering with the holes of the top flange, the retainer members at the respective ends of the track units that are connected by said one transverse connecting member each being formed with at least one hole which registers with a hole in each of said flanges, said means connecting said transverse connecting member with the retainer members comprising bolts which extend through the holes in the retainer members and through the registering holes in the flanges.

7. A drive track as claimed in claim 1, wherein at least one rib of each pad is shorter than other ribs thereof.

8. A drive track as claimed in claim 1, wherein the drive bars are secured to the pads by bolts extending through the pads and provided with retaining members each positioned in a channel between adjacent gripping ribs, the bolts being located inwardly of the loop formed by the reinforcing cable.

* * * * *